United States Patent [19]

Winslow et al.

[11] Patent Number: 5,670,439
[45] Date of Patent: Sep. 23, 1997

[54] VANADIUM-CONTAINING CATALYST SYSTEM

[75] Inventors: Linda N. Winslow, Cincinnati, Ohio; Raghu K. Menon, Houston, Tex.

[73] Assignee: Quantum Chemical Corporation, Cincinnati, Ohio

[21] Appl. No.: 583,371

[22] Filed: Jan. 5, 1996

Related U.S. Application Data

[63] Continuation-in-part of Ser. No. 412,633, Mar. 29, 1995, Pat. No. 5,534,472.

[51] Int. Cl.⁶ .................... B01J 31/00; B01J 37/00; C08F 9/02; C08F 9/60
[52] U.S. Cl. .................... 502/124; 502/104; 502/103; 502/107; 502/115; 502/116; 502/125; 502/128; 502/153; 502/158
[58] Field of Search ............... 502/107, 104, 502/113, 115, 116, 124, 119, 120, 129, 153, 158

[56] References Cited

U.S. PATENT DOCUMENTS

| | | | |
|---|---|---|---|
| 3,300,465 | 1/1967 | Bayer et al. | 502/124 |
| 4,004,071 | 1/1977 | Aishima et al. | 526/116 |
| 4,378,304 | 3/1983 | Dombro | 526/138 |
| 4,402,861 | 9/1983 | Hoff | 526/129 |
| 4,426,317 | 1/1984 | Rogers | 502/120 |
| 4,434,242 | 2/1984 | Roling et al. | 502/107 |
| 4,435,518 | 3/1984 | Pennington et al. | 502/107 |
| 4,435,520 | 3/1984 | Aylward | 502/107 |
| 4,892,853 | 1/1990 | Cann et al. | 502/112 |
| 4,918,028 | 4/1990 | Samuels et al. | 502/112 |
| 5,334,567 | 8/1994 | Menon et al. | 502/116 |
| 5,413,979 | 5/1995 | Kostiainen et al. | 502/107 |
| 5,534,472 | 7/1996 | Winslow et al. | 502/116 |

FOREIGN PATENT DOCUMENTS

| | | | |
|---|---|---|---|
| 41-19993 | 11/1966 | Japan | 502/124 |
| 44-1435 | 1/1969 | Japan | 502/124 |
| 4-180837 | 6/1992 | Japan | 502/158 |
| 89-01496 | 2/1989 | WIPO . | |

*Primary Examiner*—Glenn A. Caldarola
*Assistant Examiner*—J. Pasterczyk
*Attorney, Agent, or Firm*—William A. Heidrich

[57] ABSTRACT

A vanadium-containing catalyst system particularly suited to the polymerization of olefin polymers. The catalyst system includes a supported, first catalyst component prepared by contacting silica with hexaalkyldisilazane and thereupon with (1) a compound or complex which includes at least one carbon to magnesium covalent bond and (2) a compound which includes at least one carbon to Group 13 metal covalent bond. The sequence of contact of the silica with compound or complex (1) and compound (2) is optional. However, unless the compound or complex (1) and the compound (2) contact the silica simultaneously, the product of this contact is next contacted with whichever of compound (1) or (2) does not initially contact the silica. The product of the step of contacting with compounds (1) and (2) is washed and then contacted with a vanadium compound which includes at least one halogen atom. Finally, the product of the vanadium compound contacting step is contacted with an alcohol. A second component of the catalyst system is an organoaluminum compound cocatalyst. The catalyst system also includes a halocarbon compound promoter as a third catalyst component.

53 Claims, No Drawings

1

VANADIUM-CONTAINING CATALYST SYSTEM

CROSS-REFERENCE TO RELATED APPLICATION

This is a continuation-in-part of Ser. No. 08/412,633, filed Mar. 29, 1995, now U.S. Pat. No. 5,534,472.

BACKGROUND OF THE DISCLOSURE

1. Field of the Invention

The present invention is directed to a vanadium-containing catalyst system useful in the polymerization of olefins. More particularly, the present invention is directed to a vanadium-containing catalyst system particularly adapted to the formation of olefin polymers used in the fabrication of blow molded articles, films, cable wrap and the like.

2. Background of the Prior Art

The use of olefin polymers in fabricated articles is well established in the art. Olefin polymers combine relative low cost with chemical inertness. As such, they are particularly suitable for use as containers, films and insulating wrappings of electrical conduits such as wire and cable. Containers formed of olefin polymers, as those skilled in the art are aware, are usually prepared by blow molding techniques. Blow molded polyolefin bottles are often employed as inert containers for liquids whose properties but for the inertness of the polyolefin container would be affected by the material of construction of the container. As a result, foods, soaps, detergents and the like, which cannot be affected by the material of construction of the container, are oftentimes vended in polyolefin containers. Obviously, breakage, a problem associated with the use of glass, is not a concern when containers are fabricated of polyolefins.

Similarly, cable and wire insulating wrap is usually formed of an olefin polymer. This use is based upon the electrical insulating properties and flexibility of olefin polymers.

Olefin polymeric film is employed for many of the same reasons that prompt the use of olefin polymer in container and wire wrap applications. That is, chemical inertness and flexibility urge those involved in film forming operations to employ olefin polymers in this application.

Those skilled in the art are particularly aware of the preferred suitability, among other olefin polymers, of ethylene polymers in the formation of containers, films and wire wrap. Ethylene polymers, either homopolymers or copolymers wherein the comonomer is a higher α-olefin, such as butene or hexene, in low concentration, are particularly suitable, because of their low cost, chemical inertness and non-brittleness, for use as milk bottles, detergent bottles, food wrappings, cable wrappings and the like.

Those skilled in these arts are aware of the essential combination of processing and property characteristics required to successfully prepare these fabricated articles. Indeed, the continuing development of new olefin polymers, especially ethylene polymers, has focused upon the development of resins having both processing and article physical properties required in high volume production of cable wrap, film, containers and other blow molded articles.

A recently developed catalyst system has been developed which produces olefin resins which have a combination of product and processability properties which makes that system excellently suited for use in the production of olefin polymers employed in the formation of blow molded articles. That catalyst system is described in U.S. patent application, Ser. No. 08/412,633, now U.S. Pat. No. 5,534,472.

Although the catalyst system of the '633 application represents a significant advance in the art, that system is characterized by only moderate hydrogen sensitivity. That is, to produce an olefin polymer having a particular melt flow rate or melt index, in the case where the olefin polymer is an ethylene polymer, a catalyst system of moderate hydrogen sensitivity requires a higher hydrogen concentration in the polymerization reaction than a catalyst system having excellent hydrogen sensitivity.

In addition, those skilled in the art are aware that catalyst systems exhibiting good hydrogen sensitivity produce polymers having lower levels of oligomeric by-products than those systems whose hydrogen sensitivity is only moderate. Relatively high oligomer levels in olefin polymers produce environmental concerns in that production of oligomers, i.e. compounds containing about 8 to about 18 carbon atoms, vaporize upon subjection to high temperatures. It is well known that the fabrication of olefin polymers into fabricated articles occurs under high temperature. These steps, in the case where the polymer contains oligomers, is occasioned by smoking, i.e. emission of gas, which has detrimental health and environmental effects.

A further concern in the production of olefin polymers is the morphology of the powder produced in the polymerization reactor. One key aim in controlling polymer powder morphology is the minimization of the concentration of fines, that is, small particles. As those skilled in the art are aware, fine polymer particles, i.e. particles having an average particle diameter of less than about 90 microns, make transport of the solid polymer difficult and contribute to polymerization reactor fouling.

A problem related to the production of "fines" is the production of polymers having low bulk density. Low bulk density adds to the expense of storing and transporting polymers possessing this characteristic. Obviously, producing of polymer low in fines results in the production of a polymer having higher bulk density.

To meet the requirements imposed upon blow molding resins, the vast majority of olefin polymers destined for processing on blow molding apparatus are presently synthesized into high density polyethylene (HDPE) using silica supported chromium catalyst systems. Such systems produce HDPE's having broad molecular weight distributions.

Chromium-based catalyst systems, commonly employed to prepare ethylene polymers used in the manufacture of blow molded articles, especially bottles and the like, suffer from a major failing complicating the polymer-forming reaction. That is, chromium-based catalysts are very sensitive to polymerization upset caused by even very minor ethylene feedstock contamination. This is especially critical in that even minute concentrations of oxygen or moisture disrupt the process of polymerizing ethylene polymers when catalyzed by chromium-based catalysts, which, as stated above, is the standard prior art catalyst used in the polymerization of blow moldable grades of ethylene polymers.

Traditional Ziegler-Natta catalyst systems, based on the use of the single transition metal titanium, provide excellent control of the molecular weight of the olefin polymer product albeit they do not adequately control molecular weight distribution. Thus, although traditional titanium-containing catalyst systems have been employed in this application, they have been used in costly multiple reactor polymerization. Such reaction schemes overcome the molecular weight distribution problem but at no small cost.

Multiple reactor polymerization provide reduced production rates, increased process complexity, significant gelling, which gelling results from the immiscibility of the resin product of a first reactor with the resin product of a second reactor in the liquid state, increased capital expense and increased operating costs.

More recently, dual-site or multi-site Ziegler-Natta catalyst systems, which meet the twin requirements of absolute molecular weight and molecular weight distribution, have been developed to provide requisite polymer product and processability physical properties.

One such development is set forth in U.S. Pat. No. 4,918,038 to Samuels et al. which describes a catalyst system which comprises a vanadium-containing component. The vanadium-containing component is the reaction product of a vanadium halide and a boron trihalide or an aluminum halide which may include up to two alkyl groups. The four-component catalyst system of the '038 patent includes, as a second component, a zirconium-magnesium halogen-containing complex or a vanadium oxycompound.

Other developments pertinent to the subject of the instant invention, in addition to the aforementioned U.S. patent application, Ser. No. 08/412,633 now U.S. Pat. No. 5,534,472, include that provided in U.S. Pat. No. 4,004,071 to Aishima et al. which describes a method of homopolymerizing ethylene or copolymerizing ethylene and another olefin wherein the catalyst utilized is the reaction product of a hydrocarbon-soluble complex containing aluminum and magnesium and at least one compound selected from the group consisting of titanium and vanadium compounds which contain at least one halogen atom. These catalyst systems include a trialkyl aluminum or dialkylaluminum hydride cocatalyst.

U.S. Pat. No. 4,378,304 to Dombro describes a catalyst component, which, in conjunction with a cocatalyst and hydrogen, polymerizes ethylene. This catalyst component is the sequential reaction product of (1) a porous support of a Group IIA organometallic compound; (2) water or a hydrocarbyl alcohol; and (3) a compound of a Group IVB and/or Group VB transition metal which is preferably titanium. A cocatalyst is utilized with the catalyst component to form a catalyst system. The catalyst is a Group IA, IIA, IIIA and/or IIB organometallic compound.

U.S. Pat. No. 4,402,861 to Hoff describes an olefin polymerization catalyst which includes a solid catalyst component formed by reacting, in the presence of a solvent, any one of silica, alumina and silica-alumina, preheated to between 200° C. and 900° C., with an alcohol and a magnesium alkyl or a magnesium-aluminum complex. The sequence of reaction of the alcohol and the organomagnesium compound is optional. That is, either the alcohol or the organomagnesium compound can contact the solid inorganic oxide first followed by contact with the second of the two compounds. Finally, the resultant product is contacted with a titanium, vanadium or zirconium halide, oxyhalide or alkoxyhalide.

U.S. Pat. No. 4,426,317 to Rogers describes a catalyst composition useful in the polymerization of olefins wherein an inorganic oxide, predried to remove adsorbed water, is reacted with an organometallic compound of a Group III metal, preferably a trialkylaluminum compound. That product, in turn, is contacted with a vanadium compound wherein the vanadium has a valence of at least +3.

U.S. Pat. No. 4,434,242 to Roling et al. and U.S. Pat. No. 4,435,518 to Pennington describe similar olefin polymerization catalyst compositions. Both of these catalyst compositions are obtained by drying an inorganic oxide having surface hydroxyl groups to remove adsorbed water. The so-treated oxide is contacted with an organometallic compound having at least one alkyl group attached to a Group III metal. This organometallic compound is preferably a trialkylaluminum. The thus treated product is contacted with a vanadium halide and finally contacted with, in the case of the '242 patent, an ether-alcohol and, in the case of the '518 patent, an alcohol.

U.S. Pat. No. 4,435,520 to Aylward describes a catalyst composition similar to the aforementioned U.S. Pat. Nos. 4,434,242 and 4,435,518 but for the omission of the final alcohol or ether-alcohol contacting step. However, this patent requires that the vanadium halide be a mixture of vanadyl chloride and vanadium tetrachloride.

U.S. Pat. No. 5,334,567 to Menon et al. teaches an $\alpha$-olefin polymerization catalyst system. The system includes a solid catalyst component formed by admixing a solid inorganic oxide, a Group III organometallic compound, a vanadium-containing compound and an organic reagent which may be an alcohol, an ether, a carbonate, an amine, a phosphorus compound or a dialcohol. The catalyst system includes a halosilane cocatalyst and may include a modifying compound having the formula $M(R^4)_d X^3_{3-d}$ where M is aluminum or boron; $X^3$ is halogen; $R^4$ is saturated hydrocarbon having 1 to 12 carbon atoms; and d is 0 or an integer of 1 to 3.

In addition to the above patents, U.S. Pat. No. 4,892,853 to Cann et al. describes a vanadium catalyst system which includes a vanadium-containing catalyst component. That component is the reaction product of a vanadium halide or a vanadium acetylacetonate and an electron donor which is a liquid, organic Lewis base. That base may be an ester, a ketone, an amine, an alcohol, an ether or mixtures thereof. The catalyst composition of the '853 patent includes a hydrocarbyl aluminum cocatalyst and a halocarbon promoter.

Although the above discussion of the prior art barely skims the surface of catalyst systems employed in the synthesis of polyolefin resins, it is apparent that the catalyst systems of these and other disclosures, employed to produce an olefinic, especially ethylenic, polymer having the required combination of product and process characteristics necessary for the successful production of blow molded articles, especially bottles and other containers of liquid foods, detergents and the like, films and cable wrap can be improved to provide properties better suited to these applications.

BRIEF SUMMARY OF THE INVENTION

A new catalyst system has now been developed which is useful in the polymerization of olefins, especially ethylene polymers, particularly suited for employment in blow molding, film and cable wrap applications. These polymers combine process and product properties uniquely suited for use as film, cable wrap, bottles, containers and the like. That is, this catalyst system produces polymers characterized by rheological properties which permit rapid formation into films, cable wraps and blow molded articles, such as bottles, containers and the like, which themselves have sufficiently high strength, flexibility and leakproof properties insuring their suitability for use as films, cable wraps and containers for foodstuffs, soaps, detergents and the like. This new catalyst system, moreover, better tolerates minor concentrations of impurities, such as air, oxygen or moisture, without polymerization reaction upset. In addition, the olefin polymer produced by the catalyst system of this invention is characterized by good hydrogen sensitivity, low oligomer concentration, low concentration of fines and high bulk density.

In accordance with the present invention a catalyst system is provided. That system, useful in the polymerization of olefins, comprises a supported catalyst component; an organoaluminum compound; and a halocarbon compound. The supported catalyst component is prepared by the steps of treating silica with a hexaalkyldisilazane. The thus treated silica is contacted with a compound selected from the group consisting of (1) a compound or complex which includes at least one carbon to magnesium covalent bond and (2) a Group 13 metal compound containing at least one carbon to metal of Group 13 of the Periodic Table of the Elements covalent bond. The product of this contact is contacted with whichever of compound (1) or (2) is not used to contact the preheated silica. Alternately, the preheated silica may be simultaneously contacted with compounds (1) and (2). The product of this third contacting step is washed and thereupon contacted with a vanadium compound which includes at least one halogen atom. Finally, the product of the vanadium contacting step is contacted with an alcohol.

DETAILED DESCRIPTION

The catalyst system of the present invention includes a solid catalyst component supported on silica. The silica support provides optimum results if the silica particles have an average particle size in the range of about 30 to 600 microns. More preferably, the particle size of the silica is about 30 to 100 microns. The silica is further preferably characterized by a surface area of about 50 to 1000 square meters per gram, more preferably, about 100 to about 400 square meters per gram. The silica is also defined, in a preferred embodiment, by a pore volume of about 0.5 to 3.5 cc per gram, more preferably, about 0.5 to about 2 cc per gram.

The silica having the above characteristics is contacted with a hexaalkyldisilazane under ambient conditions. It is theorized that the improved results observed after contact with this compound is due to the reaction of the disilazane compound with hydroxyl groups on the surface of the silica particles. In a preferred embodiment, the hexaalkyldisilazane employed is hexamethyldisilazane (HMDS).

In a preferred embodiment the thus contacted silica particles are subjected to drying, to remove any water present, by heating the particles at a temperature in the range of between about 100° C. and about 200° C. for about 4 to about 12 hours. More preferably, this optional but preferred heating step is conducted at a temperature in the range of between about 125° C. and about 175° C.

The thus contacted silica is thereupon contacted with two contacting agents. The first of the two contacting agents is a compound or complex including at least one carbon to magnesium covalent bond. The second contacting agent is a compound which includes at least one covalent bond between a carbon atom and an atom of a metal of Group III of the Periodic Table of Elements. Although the above recital speaks of first and second contacting agents, the actual contact of the silica with the two agents is random. That is, this contact with the first and second contacting agents can occur simultaneously or in either order. For example, the silica contacted with hexaalkyldisilazane can first contact the compound or complex which includes at least one carbon to magnesium covalent bond or the compound which contains at least one carbon to Group III metal covalent bond. The second contacting step, however, is required to be contact between the product of the first contacting step and the agent which was not elected for contact in the first contacting step. Thus, if the first step involves contact with the magnesium-containing compound or complex then the following step is contact with the Group 13 metal-containing compound and vice versa. Alternatively, the disilazane contacted silica can simultaneously be contacted with a compound or complex which includes at least one carbon to magnesium covalent bond and a compound which includes one carbon to Group 13 metal covalent bond.

It is important to appreciate that although these two contacting steps can occur in either order, insofar as either contacting step may occur first, the polymeric product produced by polymerizing at least one olefin with the resultant solid catalyst component results in the formation of polymers having different rheological properties. These differences are important in blow molding, film forming or cable wrap forming processing of the resultant resin. It should be further appreciated, however, that, although polymer processing characteristics are observed as a result of this sequencing, variation of the polymer product properties are independent of such sequencing variation, i.e. they are substantially alike.

The first contacting step between the silica and the magnesium- or the Group 13 metal-containing compounds and the second contacting step between the product of the first contacting step and the magnesium-containing or the Group 13 metal-containing compound are preferably conducted in the presence of an inert hydrocarbon liquid under ambient conditions. Of the aliphatic and aromatic hydrocarbons that may be used as the inert liquid, alkanes are preferred. Any alkane which is liquid under ambient conditions may be utilized. Thus, $C_4$–$C_{10}$ alkanes are preferred. More preferably, a $C_5$–$C_8$ alkane is utilized in this application. Most preferably, the inert hydrocarbon liquid is hexane or heptane.

It is emphasized that not only are the two aforementioned steps preferably conducted in an inert hydrocarbon solvent but the subsequent contacting steps, discussed below, preferably take place in an inert hydrocarbon liquid. In a preferred embodiment, the hydrocarbon liquid utilized in the first two contacting steps is preferably used in the latter steps as well. Thus, it is preferred that the inert hydrocarbon liquid that serves as the silica slurrying agent, serves also as the solvent for the contacting compounds discussed below.

Turning to a detailed discussion of the first two contacting steps, which occur in random order, one of these steps is contact with a compound or complex which includes at least one carbon to magnesium covalent bond. That compound or complex preferably has the structural formula

$$MgR_2 \cdot nAlR^1_3 \qquad (I)$$

where R is the same or different and is hydrocarbyl; $R^1$ is the same or different and is hydrocarbyl; and n is 0 to about 1.

More preferably, the compound having the structural formula (I) is characterized by R being the same or different and being alkyl, alkenyl, aryl, aralkyl or alkaryl; and $R^1$ being the same or different and being alkyl, alkenyl, aryl, aralkyl or alkaryl.

Still more preferably, the magnesium-containing compound has the structural formula (I) where R is the same or different and is $C_1$–$C_8$ alkyl; $R^1$ is the same or different and is $C_1$–$C_8$ alkyl; and n is 0 to about 0.7.

Even still more preferably, the compound having the structural formula (I) is characterized by R being the same and being n-butyl; $R^1$ being the same and being ethyl; and n is 0 to about 0.133. Most preferably, n is 0 or about 0.133.

The compound which includes at least one carbon atom to Group 13 metal atom bond is preferably a compound where the Group 13 metal is aluminum. More preferably, this compound has the structural formula $$AlR^2R^3R^4 \qquad (II)$$

where $R^2$, $R^3$ and $R^4$ are the same or different and are hydrocarbyl.

Still more preferably, $R^2$, $R^3$ and $R^4$ of compound (II) are the same or different and are alkyl.

Even still more preferably, $R^2$, $R^3$ and $R^4$ of compound (II) are the same or different and are $C_2$–$C_6$ alkyl.

Most preferably, the compound having the structural formula (II) is triethylaluminum.

Upon completion of the magnesium and the Group 13 metal containing compounds contacting steps, the thus formed solid product is washed. The washing step, in a preferred embodiment, involves contacting the solid product of the contact of the magnesium and Group 13 metal-contacting compounds with the hexaalkyldisilazane contacted silica in an inert hydrocarbon liquid. The solid in the thus formed slurry is thereupon again separated from the hydrocarbon liquid and the washed solid contacted with a fresh supply of the same inert hydrocarbon to produce a new slurry.

In a particularly preferred embodiment of the washing step the inert hydrocarbon liquid used as the slurrying agent in the preferred embodiment wherein the magnesium and Group 13 metal-containing compounds contact the silica support in an inert hydrocarbon liquid is employed as the washing medium. Thus, in a preferred embodiment, the inert hydrocarbon liquid used in the washing step is an alkane. Even more preferred, the inert hydrocarbon liquid washing agent is a $C_4$ to $C_{10}$ alkane. Still even more preferably, the liquid washing agent is a $C_5$ to $C_8$ alkane. Most preferably, the inert hydrocarbon liquid washing agent is hexane or heptane.

In that the essential washing step occurs after completion of both the magnesium-containing compound and the Group 13 metal-containing compound contacting steps, this step occurs after the Group III metal-containing contacting step in the preferred embodiment wherein this step occurs subsequent to the magnesium-containing compound contacting step. Similarly, this essential washing step occurs after the magnesium-containing contacting step when this step occurs after the Group 13-metal-containing compound contacting step. Finally, in the third embodiment, wherein the magnesium-containing compound and the Group 13 metal-containing contacting steps occur simultaneously, the essential washing step occurs subsequent to that step.

It is to be appreciated that additional washing steps may be conducted although such washing steps are not essential. If additional washing steps are conducted, they are conducted in accordance with the procedure described above in the discussion of the essential washing step. If additional washing steps are conducted, they are conducted between contacting steps.

In one preferred embodiment, two washing steps are employed. In this embodiment the first of the two washing steps occur after the completion of both the Group 13 metal-containing compound and the magnesium-containing compound. The second washing step occurs after the vanadium-containing compound contacting step.

In yet another preferred embodiment of the catalyst system, the solid catalyst component is prepared in a process which includes three washing steps. In this embodiment, all washing steps are identically conducted and comprise the procedure discussed above in the description of the essential washing step. In this embodiment, a washing step occurs after the magnesium-containing compound, the Group III metal-containing compound and the vanadium-containing compound. Moreover, this embodiment is obviously outside the scope of the preferred embodiment wherein the magnesium-containing compound and the Group III metal-containing compound contacting steps occur simultaneously.

The fourth contacting step in the formation of the supported catalyst component of the catalyst system of the present invention involves contact with a vanadium compound which includes at least one halogen atom. Preferably, the vanadium compound is selected from the group consisting of a compound having the structural formula $$(R^5O)_pVO_mX_{3-p} \qquad (III)$$

where $R^5$ is $C_1$–$C_{12}$ hydrocarbyl; X is halogen; m is 0 or 1 and p is 0, 1 or 2; and a compound having the structural formula $$(R^5O)_qVX_{4-q} \qquad (IV)$$

where q is 0, 1, 2 or 3; and $R^5$ and X have the meanings given above.

More preferably, the compounds having the structural formulae (III) and (IV) are characterized by p, q and r being 0; and X being chlorine or bromine. Thus, such compounds as $VOCl_3$, $VOBr_3$, $VCl_4$, $VBr_4$, $VCl_3$ and $VBr_3$ are particularly preferred for use in the formation of the solid catalyst component of the present invention. Most preferably, the vanadium compound is $VOCl_3$, $VCl_4$ or $VCl_3$.

The final contacting agent in the formation of the solid catalyst component of the catalyst system of this invention is an alcohol. Preferably, the alcohol utilized in the formation of the solid catalyst component has the structural formula $$R^6OH \qquad (V)$$

where $R^6$ is $C_1$–$C_{12}$ hydrocarbyl.

More preferably, the compound having the structural formula (V) is characterized by $R^6$ being $C_1$–$C_{12}$ alkyl. Still more preferably, structural formula (V) is defined by $R^6$ being $C_1$–$C_8$ alkyl. Even still more preferably, $R^6$ in structural formula (V) is $C_2$–$C_6$ alkyl. Most preferably, the alcohol having the structural formula (V) is n-butanol.

As stated above, the contacting steps preferably occur in an inert hydrocarbon solvent. Thus in a preferred embodiment, a slurry is initially formed of hexaalkyldisilazane contacted silica by disposing particles thereof in an inert liquid hydrocarbon. The remaining contacting agents are thereupon added thereto. In preferred embodiments, the added contacting compounds are themselves dissolved in an inert hydrocarbon liquid solvent. Even more preferably, the solvent used to slurry the silica is identical to the solvent used to form solutions of the contacting compounds introduced therein.

It is preferable that the contacting agents be present in fixed concentrations in order to produce a more effective catalyst component. To that end each contacting agent employed in the formation of the supported catalyst component is preferably present in a concentration range based on a fixed amount of the dried, solvent-free support. Thus, the compound or complex which includes at least one magnesium to carbon covalent bond is preferably present such that its concentration is in the range of between about 0.1 millimole and about 2.0 millimoles of magnesium per gram of silica. More preferably, the magnesium-containing compound or complex contacts silica such that the concentration of the magnesium-containing compound or complex provides about 0.15 millimole to about 1.4 millimoles of magnesium per gram of silica. Still more preferably, the concentration of the magnesium-containing compound or complex provides about 0.2 millimole to about 1.0 millimole of magnesium per gram of silica.

The Group 13 metal-containing organic compound is preferably provided in a concentration, in the formation of the solid catalyst component, such that between about 0.1 millimole to about 2.0 millimoles of the Group 13 metal contacts 1 gram of the silica particles which constitute the support. More preferably, the concentration of the Group 13 metal in the Group 13 metal-containing compound is in the range of between about 0.15 millimole and about 1.4 millimoles per gram of silica. Still more preferably, the concentration of the Group 13 metal in the Group 13 metal-containing compound is in the range of between about 0.2 millimole and about 1.0 millimole per gram of silica.

The vanadium compound whose inclusion characterizes the solid catalyst component is preferably employed in an amount such that the vanadium concentration is between about 0.2 millimole and about 1.4 millimoles per gram of silica. More preferably, the vanadium concentration in the vanadium-containing compound is in the range of between about 0.4 millimole and about 1.2 millimoles per gram of silica. Still more preferably, the concentration of the vanadium-containing compound, as measured by vanadium concentration, is between about 0.6 millimole and about 0.9 millimole of vanadium per gram of silica.

The final contacting agent, an alcohol, is preferably present in the concentration such that there are between about 0.01 millimole and about 2.0 millimoles of the alcoholic contacting agent per gram of silica. More preferably, the alcohol is present in an amount in the range of between about 0.1 millimole and about 1.0 millimole per gram of silica. Still more preferably, the alcohol compound concentration is between about 0.1 millimole and about 0.5 millimole per gram of silica.

It is preferred that the vanadium compound be present relative to the alcoholic compound such that the molar ratio of alcohol to vanadium compound is no more than about 1. More preferably, the molar ratio of the alcoholic compound to the vanadium compound, employed in the formation of the solid catalyst component, is in the range of between about 0.05:1 and about 1:1. Still more preferably, the molar ratio of the alcoholic compound to the vanadium compound is in the range of between about 0.1:1 and about 0.6:1. Even more preferably, this molar ratio is in the range of between about 0.2:1 and about 0.3:1.

The catalyst system of the present invention includes, as a second catalyst component, an organoaluminum compound cocatalyst. Preferably, the cocatalyst organoaluminum compound has the structural formula $$AlR^7_r X^1_{3-r} \quad \text{(VI)}$$

where $R^7$ is the same or different and is hydrocarbyl; $X^1$ is halogen; and r is an integer of 1 to 3. More preferably, $R^7$ is $C_1$–$C_8$ hydrocarbyl; and $X^1$ is chlorine or bromine. Still more preferably, the aluminum compound having the structural formula (VI) is characterized by $R^7$ being the same or different and being $C_1$–$C_8$ alkyl; and r being 3. Even still more preferably, the organoaluminum compound having the structural formula (VI) is characterized by $R^7$ being the same and being $C_1$–$C_4$ alkyl.

The third catalyst component in the catalyst system of the present invention is a halogen-containing promoter. That promoter is preferably characterized by the structural formula $$E_t H_s X^2_{2t+2-s} \quad \text{(VII)}$$

where E is carbon, silicon, germanium or tin; $X^2$ is the same or different and is halogen; t is an integer of 1 to 5; and s is 0 or an integer of 1 to 11.

More preferably, the halogen-containing compound promoter having the structural formula (VII) is a halocarbon where E is carbon; $X^2$ is the same or different and is fluorine, chlorine or bromine; t is an integer of 1 to 3; and s is 0 or an integer of 1 to 7.

Preferred halocarbon compounds, used as promoters in the catalyst system of the present invention, include carbon tetrachloride, carbon tetrabromide, dichloromethane, dibromomethane, trichloromethane (chloroform), tribromomethane, 1,1,1-trichloroethane, 2,2-difluorotetrachloroethane, 1-dichlorofluoro-3-difluorochloropropane, methyl bromide, 1,1-dichloro-2,2,2-trifluoroethane, dichlorofluoromethane, trichlorofluoromethane and heptachloropropane.

The organoaluminum compound cocatalyst is preferably present such that the molar ratio of aluminum in the organoaluminum compound cocatalyst to vanadium in the solid, first catalyst component is in the range of between about 10:1 and about 100:1. More preferably, this molar ratio is in the range of between about 15:1 and about 80:1. Still more preferably, the ratio of aluminum in the second catalyst component to vanadium in the first catalyst component encompasses a molar ratio of between about 20:1 and about 60:1. Even still more preferably, this molar ratio is in the range of between about 30:1 and about 50:1. Most preferably, the molar ratio of aluminum in the second catalyst component to vanadium in the first catalyst component is about 40:1.

The concentration of the halocarbon promoter, the third catalyst component of the catalyst system of this invention, is preferably such that the molar ratio of aluminum in the cocatalyst component to the halogen-containing promoter compound is in the range of between about 0.05:1 and about 20.0:1. More preferably, this molar ratio is in the range of between about 0.2:1 and about 5.0:1. Still more preferably, the molar ratio of aluminum in the organoaluminum cocatalyst to the halogen-containing promoter compound is in the range of between about 0.50:1 and about 2.0:1. Most preferably, this molar ratio is about 1:1.

The olefin or olefins, which, in a preferred embodiment, comprises ethylene, polymerized utilizing the catalyst system of the present invention provides polymers well suited for processing into films, cable wrap and blow molded articles. In particular, the olefin polymers produced utilizing the catalyst system of the present invention are characterized not only by physical properties well suited for use as these fabricated articles but, in addition, by physical properties suitable for processing of these polymers during the fabrication of these articles.

The following examples are provided to illustrate the scope of the present invention. Because these examples are given solely for illustrative purposes, the present invention should not be limited thereto.

COMPARATIVE EXAMPLE 1

Preparation of a Vanadium-Containing Solid Catalyst Component

Silica (2.0 g) (Davison Chemical Company Grade 948) was dried for 6 hours at 200° C. in a dry nitrogen fluidized bed. Prior to further processing the silica was disposed in a three-neck flask, equipped with a nitrogen inlet, overhead stirrer shaft/blade and rubber septum. This operation, as were all further steps in the preparation of the solid catalyst, was conducted in a dry nitrogen atmosphere utilizing a Braun Labmaster [trademark] 130 glovebox. The silica in the flask was thereupon moved to a Schlenk line and processing was conducted under Schlenk techniques to ensure the exclusion of moisture and oxygen. A nitrogen line was attached and heptane (20 ml.) added to the flask to form a silica slurry. Thereupon a solution of 0.5M $(C_4H_9)_2Mg.0.133Al(C_2H_5)_3$ in heptane (2.8 ml.) was added to the slurry. This solution was stirred with the silica slurry for 30 minutes at ambient temperature and pressure. Thereupon, 0.5M solution of triethylaluminum (TEAL) in heptane (2.8 ml.) was added to the slurry in the flask. Again, the thus formed mixture was stirred for 30 minutes at ambient temperature and pressure. Thereupon, a 0.53M solution of vanadium tetrachloride in heptane (3.0 ml.) was added. As before, the thus formed mixture was stirred for 30 minutes at ambient temperature and pressure. Finally, a 0.5M solution of n-butanol in heptane (0.8 ml.) was introduced into the flask. Again, the added solution was stirred for 30 minutes at ambient temperature and pressure. The solid catalyst component was recovered by heating the slurry under a nitrogen purge to remove the heptane solvent by evaporation.

A summary of the solid catalyst component of this example is included in Table 1.

COMPARATIVE EXAMPLE 2

Preparation of a Vanadium-Containing Solid Catalyst Component

Comparative Example 1 was identically reproduced but for the processing of the silica support. Instead of heating the silica for 6 hours at 200° C., the silica was contacted, at room temperature, with HMDS, wherein the concentration of HMDS was in excess of that stoichiometrically required to insure complete reaction with hydroxyl groups on the surface of the silica. Upon completion of the HMDS contacting step, the HMDS contacted silica was dried in a nitrogen oven at 150° C. Thereupon the solid catalyst component was prepared in accordance with the procedure set forth in Comparative Example 1. That is, but for the substitution of HMDS contacted silica for the uncoated silica of Comparative Example 1 the two examples were identical.

This example is summarized in Table 1.

COMPARATIVE EXAMPLE 3

Polymerization of Ethylene Using Catalyst Component of Comparative Example 1

Ethylene was continuously polymerized in a stainless steel 2-liter reactor maintained at a temperature of 90° C. and a pressure of 450 psig. The batch polymerization was conducted in isobutane (1 l.) which filled the reactor to half its capacity. The polymerization was conducted for 1 hour.

Initially, a 0.5M solution of triethylaluminum (TEAL) in heptane (3.5 ml.) was charged into the reactor followed by isobutane (1 liter). Hydrogen gas (83 mmol) was then introduced followed by feeding therein of ethylene. The catalyst component (0.05 g) prepared in accordance with Comparative Example 1 was thereupon charged into the reactor. Finally, a 0.5M solution of dibromomethane in heptane (3.5 ml.) was added. As stated above, the thus prepared polymerization reactant was allowed to polymerize for 1 hour. As also stated above, the thermodynamic conditions were 90° C. and 450 psig. The intermittent addition of ethylene gas provided the 450 psig pressure maintained in the reactor. This addition resulted in an overall ethylene concentration in the ethylene polymerization reaction mixture of 15 mole %.

The ethylene homopolymer produced in this polymerization reaction was tested, in accordance with ASTM Standard Test Procedure D-1238, to determine its melt index.

A summary of the results of this example is included in Table 1.

COMPARATIVE EXAMPLE 4

Polymerization of Ethylene Using the Catalyst Component of Comparative Example 2

Comparative Example 3 was identically reproduced but for the replacement of the solid catalyst component of Comparative Example 1 with the solid catalyst component of Comparative Example 2.

The physical property measured in Comparative Example 3, i.e. melt index, of the polyethylene homopolymer was again determined.

The results of this example are tabulated in Table 1.

COMPARATIVE EXAMPLE 5

Polymerization of Ethylene Using the Catalyst Component of Comparative Example 1

Ethylene was continuously polymerized in a carbon steel 88-gallon reactor maintained at a temperature of 100° C. and a pressure of 620 psig. The continuous polymerization was conducted in isobutane which filled the reactor.

The polymerization reactor was conducted under conditions which produced an average residence time of between 1 hour and 1½ hours. During the polymerization ethylene was continuously fed into the isobutane filled reactor such that the ethylene was present in a concentration of between 10 and 15 mole %, based on the number of moles of isobutane present in the reactor. Hydrogen gas was likewise continuously fed into the reactor such that its concentration was about 0.18 mole again based on the molar concentration of the isobutane.

The catalyst system included the catalyst compound of Comparative Example 1 present in a concentration such that about 100 lbs. of ethylene polymer were produced per hour of polymerization operation. The catalyst system also included a cocatalyst, triethylaluminum (TEAL), present in a concentration sufficient to produce the aforementioned polymer productivity of 100 lbs. per hour. To produce this rate the TEAL concentration ranged between 500 ppm and 1,500 ppm based on the weight of the isobutane solvent. Finally, the catalyst system included trichlorofluoromethane in a concentration which ranged from 500 ppm to 1500 ppm based on the weight of the isobutane solvent.

The polyethylene product of this example was measured to determine its melt index in accordance with the procedure employed in Comparative Example 3. In addition, the polymeric product was analyzed to determine its oligomeric concentration, as manifested by its concentration of molecules containing 8 to 18 carbon atoms as a percent of the total polymeric product. The oligomeric determination was obtained by standard gas chromatographic techniques in which an oligomeric solution, prepared by extracting the soluble component of the polymer produced in this example in a cyclohexane solvent, was analyzed.

The results of this example are summarized in Table 1.

COMPARATIVE EXAMPLE 6

Polymerization of Ethylene Using the Catalyst Component of Comparative Example 2

The ethylene polymerization of Comparative Example 5, was identically repeated but for the substitution of the catalyst component of Comparative Example 2 for the catalyst component of Comparative Example 1 employed in Comparative Example 5. In addition, the hydrogen gas concentration was decreased to 0.10 mole percent, again based on the total concentration of the reactants.

The polyethylene product of this example was analyzed to determine the physical properties, i.e. melt index and oligomeric concentration, reported in Comparative Example 5.

This example is summarized in Table 1.

using the uncoated silica supported catalyst component, establishes the superiority of an HMDS treated silica supported catalyst component in terms of reduced oligomeric generation.

Those skilled in the art are aware that oligomeric generation is a function of melt index. Thus, Comparative Examples 5 and 6 were specially designed, by appropriate adjustment of hydrogen concentration during polymerization, to produce polymeric products having substantially the same melt indices. Therefore, the oligomeric concentration of the polymeric products of these two examples establish the improved oligomeric propensity of a catalyst component produced using a HMDS treated silica support.

EXAMPLE 1

Preparation of Vanadium-Containing Solid Catalyst Component

The solid catalyst component of Comparative Example 2 was reproduced with the exceptions that the concentration of

TABLE 1

SOLID CATALYST COMPONENT CONSTITUENTS

| EXAMPLE NO. | SILICA | $(C_4H_9)_2Mg0.133Al(C_2H_5)_3$ | TEAL | $VCl_4$ | BUTANOL |
|---|---|---|---|---|---|
| CE1 | Uncontacted, 1 g | 0.7 mmol | 0.7 mmol | 0.8 mmol | 0.2 mmol |
| CE2 | HMDS Contacted, 1 g | 0.7 mmol | 0.7 mmol | 0.8 mmol | 0.2 mmol |

POLYMERIC CHARACTERISTICS

| EXAMPLE NO. | EMPLOYING CAT. COMP. OF EX. NO. | MI | OLIGOMER ($C_8$ TO $C_{18}$) CONCENTRATION |
|---|---|---|---|
| CE3 | CE1 | 0.31 | — |
| CE4 | CE2 | 6.0 | — |
| CE5 | CE1 | 0.14 | 1818 ppm |
| CE6 | CE2 | 0.16 | 415 ppm |

ANALYSIS OF THE DATA IN TABLE 1

The data in Table 1 establishes that contact of the silica support with HMDS increases hydrogen sensitivity and reduces the level of residual oligomeric concentration. The higher melt index of the ethylene homopolymer produced in the polymerization of Comparative Example 4, which polymerization was catalyzed with the solid catalyst component of Comparative Example 2, compared to the melt index of the ethylene polymer produced in the polymerization of Comparative Example 3, which polymerization was catalyzed with the solid catalyst component of Comparative Example 1, establishes the greater hydrogen sensitivity of the catalyst component supported on HMDS-contacted silica compared to the uncontacted silica support.

Those skilled in the art are aware that a polymeric product manifestation of catalyst hydrogen sensitivity is its melt index. That is, a first ethylene polymer, produced at the same hydrogen concentration as a second ethylene polymer, will have a higher melt index than the second ethylene polymer if the catalyst component employed in the formation of the first ethylene polymer has a higher hydrogen sensitivity than the catalyst component employed in the formation of the second ethylene polymer.

The more than 75% reduction in oligomeric concentration in the polymeric product of Comparative Example 6, produced using the HMDS treated silica supported catalyst component, compared to the oligomeric concentration of the polymeric product of Comparative Example 5, produced the TEAL used in this preparation was reduced to 0.3 mmol of Al per gram of silica from the 0.7 mmol of Al per gram of silica used in Comparative Example 2 and (2) there was a washing step subsequent to the completion of TEAL contacting step.

The washing step involved the separation of the solid contact product of HMDS treated silica, the magnesium complex and TEAL from the heptane slurrying agent. The separated solid was thereupon contacted with fresh heptane (20 ml). The solid was once again separated therefrom and thereupon reslurried in fresh heptane (20 ml). The heptane was once again removed by decantation from the solid and again reslurried in fresh heptane (20 ml). A solution of vanadium tetrachloride, prepared as in Comparative Example 1, was introduced into the slurry. Subsequently, the solid in the slurry was contacted with n-butanol, in accordance with the procedure of Comparative Example 1.

A summary of this example is included in Table 2.

COMPARATIVE EXAMPLE 7

Preparation of Vanadium-Containing Solid Catalyst Component

A vanadium-containing solid catalyst component was prepared in accordance with the procedure of Example 1 except that the washing step, subsequent to the TEAL contacting step and prior to the $VCl_4$ contacting step, was omitted.

This example is tabulated in Table 2.

EXAMPLE 2

Preparation of Vanadium-Containing Solid Catalyst Component

A vanadium-containing solid catalyst component was prepared in accordance with the procedure set forth in Comparative Example 2 except that washing steps, each conducted in accordance with the procedure mentioned in Example 1, were conducted subsequent to the magnesium complex contacting step, the TEAL contacting step, the $VCl_4$ contacting step and the n-butanol contacting step.

This example is included in Table 2.

COMPARATIVE EXAMPLE 8

Preparation of Vanadium-Containing Solid Catalyst Component

A vanadium-containing solid catalyst component was prepared in accordance with the procedure of Comparative Example 2. This component was thus identical to the solid catalyst component of Example 2 but for the absence of the four washing steps employed in that preparation.

Table 2 includes a summary of this example.

EXAMPLE 3

Preparation of Vanadium-Containing Solid Catalyst Component

The solid catalyst component of Example 1 was identically reproduced but for minor changes in the concentrations of the initially charged magnesium-containing complex $(C_4H_9)_2Mg.0.133Al(C_2H_5)_3$ from 0.7 mmol to 0.5 mmol per gram of HMDS treated silica and the subsequently charged aluminum-containing compound TEAL from 0.3 mmol to 0.5 mmol per gram of HMDS treated silica.

This preparation is summarized in Table 2.

EXAMPLE 4

Preparation of Vanadium-Containing Solid Catalyst Component

The preparation of the solid catalyst component of Example 3 was reproduced but for the reversal of the sequence of contact of the magnesium-containing complex and the aluminum-containing compound. That is, HMDS-contacted silica was contacted with the same concentration of TEAL and $(C_4H_9)_2Mg.0.133Al(C_2H_5)_3$, 0.5 mmol per gram of HMDS treated silica support. However, whereas the silica was contacted initially with the magnesium-containing complex followed, without washing, by contact with TEAL in Example 3, in Example 4 the HMDS-contacted silica was initially contacted with TEAL, followed, without washing, by contact with the magnesium-containing complex.

The above difference between the solid catalyst component of Example 3 and that of the present example necessitated another distinction between the two examples. Although the catalyst components of the two examples both employed one washing step after contact with both the magnesium complex and aluminum compound, the reversal in sequence required that the washing step in this example was subsequent to the magnesium complex contacting step, rather than after the aluminum compound contacting step as in Example 3.

A summary of Example 4 is included in Table 2.

EXAMPLE 5

Preparation of Vanadium-Containing Solid Catalyst Component

The preparation of the solid catalyst component of Example 4 was identically reproduced but for the concentrations of the same magnesium complex and aluminum compound used in that example. In this example the solid catalyst component was formulated using 0.7 millimole per gram of HMDS treated silica of each of these two contacting agents rather than 0.5 millimole per gram of HMDS treated silica employed in Example 4.

A summary of Example 5 is included in Table 2.

EXAMPLES 6 TO 10 AND COMPARATIVE EXAMPLES 9 AND 10

Polymerization of Ethylene Using the Solid Catalyst Components of Examples 1 to 5 and Comparative Examples 7 and 8

The polymerization procedure of Comparative Example 3 was repeated but for the substitution of the solid catalyst component used therein with the solid catalyst components prepared in Example 1, Comparative Example 7, Example 2, Comparative Example 8 and Examples 3 to 5 in Example 6, Comparative Example 9, Example 7, Comparative Example 10 and Examples 8 to 10, respectively.

The results of these polymerizations are summarized in Table 2. Table 2 reports catalytic activity of the catalyst systems employed, measured as grams of polymer product per gram of solid catalyst component per hour. In addition, Table 2 sets forth the ethylene polymer products of these polymerizations in terms of mean particle size (MPS), measured in microns by a Malvern Model 2600 laser diffraction particle size analyzer, % fines, i.e. the fraction of the polymeric product which has a particle size of less than 90 microns, and bulk density, as measured by ASTM Standard Test Procedure D-1895.

TABLE 2

| | | FORMATION OF SOLID CATALYST COMPONENT | | | | | | | |
|---|---|---|---|---|---|---|---|---|---|
| EXAMPLE NO. | HMDS SILICA | $(C_4H_9)_2Mg0.133Al(C_2H_5)_3$ | WASH | TEAL | WASH | $VCl_4$ | WASH | m-$C_4H_9$OH | WASH |
| 1 | 1 g. | 0.7 mmol | No | 0.3 mmol | Yes | 0.8 mmol | No | 0.2 mmol | No |
| CE7 | 1 g. | 0.7 mmol | No | 0.3 mmol | No | 0.8 mmol | No | 0.2 mmol | No |
| 2 | 1 g. | 0.7 mmol | Yes | 0.7 mmol | Yes | 0.8 mmol | Yes | 0.2 mmol | No |
| CE8 | 1 g. | 0.7 mmol | No | 0.7 mmol | No | 0.8 mmol | No | 0.2 mmol | No |
| 3 | 1 g. | 0.5 mmol | No | 0.5 mmol | Yes | 0.8 mmol | No | 0.2 mmol | No |

TABLE 2-continued

FORMATION OF SOLID CATALYST COMPONENT

| EXAMPLE NO. | HMDS SILICA | TEAL | WASH | $(C_4H_9)_2Mg\cdot0.133Al(C_2H_5)_3$ | WASH | $VCl_4$ | WASH | $m\text{-}C_4H_9OH$ | WASH |
|---|---|---|---|---|---|---|---|---|---|
| 4 | 1 g. | 0.5 mmol | No | 0.5 mmol | Yes | 0.8 mmol | No | 0.2 mmol | No |
| 5 | 1 g | 0.7 mmol | No | 0.7 mmol | Yes | 0.8 mmol | No | 0.2 mmol | No |

POLYMERIZATION RESULTS

| EXAMPLE NO. | USING COMPONENT OF EXAMPLE NO | ACTIVITY gP/gCAT-HR | POLYMER CHARACTERISTICS | | |
|---|---|---|---|---|---|
| | | | MPS, μ | FINES, % | BULK DENS., LB/FT³ |
| 6 | 1 | 1694 | 490 | 6.1 | 21.8 |
| CE9 | CE7 | 2298 | 318 | 11.3 | 19.4 |
| 7 | 2 | 1616 | 608 | 4.5 | 20.8 |
| CE10 | CE8 | 1863 | 350 | 20.1 | 12.9 |
| 8 | 3 | 1774 | 678 | 0.7 | 25.6 |
| 9 | 4 | 1820 | 520 | 2.8 | 23.5 |
| 10 | 5 | 2300 | 526 | 2.3 | 23.2 |

DISCUSSION OF RESULTS SUMMARIZED IN TABLE 2

The results of Table 2 establish the criticality of at least one wash step in the formation of the solid catalyst component. The polymerization products of Example 3 and Comparative Example 7 utilizing the solid catalyst components of Example 1 and Comparative Example 5, respectively, demonstrate higher mean particle size, lower concentration of fines and higher bulk density in polymers polymerized in catalyst systems that include a solid catalyst component which differs only by the inclusion of a single wash step in its formation. These improvements are noted at the very small cost of slightly lower catalytic activity.

The comparison between the polymerization results of Example 7 and Comparative Example 8 again demonstrates the effect on the polymerization product resulting from the inclusion of washing steps in the formation of the solid catalyst component of Example 2 compared to the absence of these steps in the catalyst component of Comparative Example 6. The same improvements, demonstrated in the comparison between the polymerization products of Example 6 and Comparative Example 7, are present in this latter comparison.

This latter comparison particularly emphasizes the criticality of the washing step or steps in that the formulation utilized a concentration of the Group III metal-containing compound, TEAL, that, although within the scope of the present invention, was outside the most preferred concentration range.

Examples 9 and 10 demonstrate that the sequence of contacting of the magnesium-containing species and the Group III metal-containing species, in the formation of the catalyst components of Example 4 and 5, respectively, although affecting the morphology of the product polymer, compared to a component formed in reverse order, is far less important than is the presence or absence of a washing step.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed:

1. A vanadium-containing catalyst comprising:
    (A) a supported catalyst component prepared by the steps of
        (a) contacting silica with a hexaalkyldisilazane;
        (b) contacting said silica product of step (a) with a contacting agent selected from the group consisting of (1) a compound or complex which includes at least one carbon to magnesium covalent bond, (2) a compound which includes at least one carbon to a metal of Group 13 of the Periodic Table of the Elements covalent bond and (3) both a compound or complex which includes at least one carbon to magnesium covalent bond and a compound which includes at least one carbon to Group 13 metal covalent bond;
        (c) contacting said product of step (b) with whichever of contacting agents (1) and (2) does not contact said silica in step (b), with the proviso that this step is omitted if said contacting agent in step (b) is (3);
        (d) washing said product of step (b) or (c);
        (e) contacting said product of step (d) with a vanadium compound which includes at least one halogen atom; and
        (f) contacting said product of step (e) with an alcohol;
    (B) an organoaluminum compound cocatalyst; and
    (C) a halogen-containing promoter compound having the structural formula $E_tH_sX^2_{2t+2-s}$ where E is carbon, silicon, germanium or tin; $X^2$ is the same or different and is halogen; t is an integer of 1 to 5; and s is 0 or an integer of 1 to 11.

2. A catalyst in accordance with claim 1 wherein said silica product of step (a) is heated to a temperature in the range of between about 100° C. and about 200° C. prior to step (b).

3. A catalyst in accordance with claim 2 wherein said hexamethyldisilazane is hexamethyldisilazane.

4. A catalyst in accordance with claim 1 wherein said compound or complex (1) has the structural formula

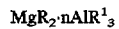

$MgR_2\cdot nAlR^1_3$ where R is the same or different and is hydrocarbyl; $R^1$ is the same or different and is hydrocarbyl; and n is 0 to about 1.

5. A catalyst in accordance with claim 4 where R is the same or different and is $C_1$–$C_8$ alkyl; $R^1$ is the same or different and is $C_1$–$C_8$ alkyl; and n is 0 to about 0.7.

6. A catalyst in accordance with claim 5 wherein R is the same and is n-butyl; $R^1$ is the same and is ethyl; and n is 0 or about 0.133.

7. A catalyst in accordance with claim 1 wherein said Group 13 metal of said compound (2) is aluminum.

8. A catalyst in accordance with claim 7 wherein said compound (2) has the structural formula $$AlR^2R^3R^4$$

where $R^2$, $R^3$ and $R^4$ are the same or different and are hydrocarbyl.

9. A catalyst in accordance with claim 8 wherein $R^2$, $R^3$ and $R^4$ are the same or different and are $C_2$–$C_6$ alkyl.

10. A catalyst in accordance with claim 9 wherein said compound (2) is triethylaluminum.

11. A catalyst in accordance with claim 1 wherein said vanadium compound which includes at least one halogen atom is selected from the group consisting of $$(R^5O)_pVO_mX_{3-p} \quad (i)$$

where $R^5$ is $C_1$–$C_{12}$ hydrocarbyl; X is halogen; m is 0 or 1 and p is 0, 1 or 2; and $$(R^5O)_qVX_{4-q} \quad (ii)$$

where q is 0, 1, 2 or 3; and $R^5$ and X have the meanings given above.

12. A catalyst in accordance with claim 11 where p and q are 0; and X is chlorine or bromine.

13. A catalyst in accordance with claim 1 wherein said alcohol has the structural formula $R^6OH$, where $R^6$ is hydrocarbyl.

14. A catalyst in accordance with claim 13 wherein $R^6$ is $C_1$–$C_{12}$ alkyl.

15. A catalyst in accordance with claim 14 wherein $R^6$ is n-butyl.

16. A catalyst in accordance with claim 1 including a washing step subsequent to said step (e).

17. A catalyst in accordance with claim 1 including a washing step subsequent to said step (f).

18. A catalyst in accordance with claim 1 wherein said contacting agents (1) and (2) are separately introduced and wherein each of these separate contacting steps is followed by a washing step.

19. A catalyst in accordance with claim 1 wherein said contacting agents (1) and (2) are introduced together in said step (b).

20. A catalyst in accordance with claim 16 including a washing step subsequent to step (f).

21. A catalyst in accordance with claim 1 wherein said component (B) is a compound having the structural formula $$AlR^7_rX^1_{3-r}$$

where $R^7$ is the same or different and is hydrocarbyl; $X^1$ is halogen; and r is an integer of 1 to 3.

22. A catalyst in accordance with claim 21 wherein $R^7$ is the same or different and is $C_1$–$C_8$ alkyl; and $X^1$ is chlorine or bromine.

23. A catalyst in accordance with claim 22 wherein $R^7$ is the same or different and is $C_1$–$C_4$ alkyl; and r is 3.

24. A catalyst system in accordance with claim 1 wherein E is carbon; $X^2$ is the same or is fluorine, chlorine or bromine, t is an integer of 1 to 3; and s is 0 or an integer of 1 to 7.

25. A catalyst system in accordance with claim 24 wherein said component (C) is selected from the group consisting of carbon tetrachloride, carbon tetrabromide, dichloromethane, dibromomethane, chloroform, tribromomethane, 1,1,1-trichloroethane, 2,2-difluorotetrachloroethane, 1-dichlorofluoro-3 difluorochloropropane, methyl bromide, 1,1-dichloro-2,2,2-trifluorethane, dichlorofluoromethane, trichlorofluoromethane and heptachloropropane.

26. A catalyst system in accordance with claim 1 wherein said components (A) and (B) are present in concentrations such that the molar ratio of aluminum in said component (B) to vanadium in said component (A) is in the range of between about 10:1 and about 100:1.

27. A catalyst system in accordance with claim 26 wherein component (B) and component (C) are present such that the molar ratio of aluminum in said component (B) to the number of moles of said halogen-containing promoter compound of said component (C) is in the range of between about 0.05:1 and about 20.0:1.

28. A catalyst system in accordance with claim 27 wherein said molar ratio of aluminum in said component (B) to vanadium in said component (A) is in the range of between about 15:1 and about 80:1; and said molar ratio aluminum in said component (B) to the number of moles of said halogen-containing promoter compound of said component (C) is in the range of between about 0.5:1 and about 3.0:1.

29. A catalyst system in accordance with claim 28 wherein said molar ratio of aluminum in said component (B) to vanadium in said component (A) is in the range between about 20:1 and about 60:1; and said molar ratio of aluminum in said component (B) to the number of moles of said halogen-containing promoter compound of said component (C) is in the range of between about 0.50:1 and about 2.0:1.

30. A catalyst system in accordance with claim 29 wherein said vanadium compound used in the formation of component (A) is vanadium tetrachloride, said organoaluminum compound of component (B) is triethylaluminum and said halogen-containing promoter compound of component (C) is dibromomethane.

31. A vanadium-containing catalyst component formed by the steps which comprise:

(a) contacting silica particles with a hexaalkyldisilazane;

(b) disposing said product of step (a) in an inert hydrocarbon liquid under ambient conditions, whereby a slurry is formed;

(c) contacting said slurry with a contacting agent selected from the group consisting of (1) a compound or complex which includes at least one carbon to magnesium covalent bond, (2) a compound which includes at least one carbon to metal of Group 13 of the Periodic Table of the Elements covalent bond and (3) a mixture thereof wherein said compound (1), if present, is introduced into said slurry at a concentration in the range of between about 0.1 millimole and about 2.0 millimoles of magnesium per gram of silica and said compound (2) is introduced into said slurry at a concentration in the range of between about 0.1 millimole and about 2.0 millimoles of said Group 13 metal per gram of silica;

(d) contacting the product of step (c) with whichever of compound (1) or (2) that does not contact said silica in step (c), said concentration of said compound (1) or (2) per gram of silica being the concentration of that compound recited in step (c), with the proviso that this step is omitted if (3) a mixture of compounds (1) and (2) is introduced into said slurry in step (c);

(e) washing said product of step (c) or (d) with said insert hydrocarbon liquid slurrying agent;

(f) contacting the product of step (e) with a vanadium compound which includes at least one halogen atom in a concentration such that between about 0.2 millimole and about 2.0 millimoles of vanadium are present per gram of silica; and (g) contacting the product of step (f) with an alcohol in a concentration such that between about 0.1 millimole and about 2.0 millimoles of alcohol per gram of silica.

32. A catalyst component in accordance with claim 31 wherein said compound or complex (1) has the structural formula

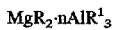

where R is the same or different and is hydrocarbyl; $R^1$ is the same or different and is hydrocarbyl; and n is 0 to about 1, and is present in a concentration in the range of between about 0.15 millimole and about 1.4 millimoles of magnesium per gram of silica.

33. A catalyst component in accordance with claim 32 wherein said compound (2) has the structural formula $AlR^2R^3R^4$, where $R^2$, $R^3$ and $R^4$ are the same or different and are alkyl, and is present in a concentration in the range of between about 0.15 millimole and about 1.4 millimoles of aluminum per gram of silica.

34. A catalyst component in accordance with claim 39 wherein said vanadium compound is selected from the group consisting of $VOCl_3$; $VOBr_3$, $VCl_4$, $VBr_4$, $VCl_3$ and $VBr_3$ and is present in a concentration in the range of between about 0.4 millimole and about 1.2 millimoles of vanadium per gram of silica.

35. A catalyst component in accordance with claim 34 wherein said vanadium compound and said alcohol are present such that the molar ratio of said alcohol to said vanadium compound is no more than about 1.

36. A catalyst component in accordance with claim 35 wherein said molar ratio of said alcohol to said vanadium compound is in the range of between about 0.05:1 and about 1:1.

37. A catalyst component in accordance with claim 36 wherein said alcohol has the structural formula $R^6OH$, where $R^6$ is $C_1$–$C_{12}$ alkyl and is present in a concentration in the range of between about 0.15 millimole and about 1.0 millimole per gram silica.

38. A catalyst component in accordance with claim 37 wherein said inert hydrocarbon liquid is a $C_5$ to $C_8$ alkane.

39. A catalyst component in accordance with claim 38 wherein said compound or complex (1) is present in a concentration in the range of between about 0.2 millimole and about 1.0 millimole of magnesium per gram of silica and wherein R is n-butyl; $R^1$ is ethyl; and n is 0 or 0.133.

40. A catalyst component in accordance with claim 39 wherein said compound (2) is present in a concentration in the range of between about 0.2 millimole and about 1.0 millimole of aluminum per gram of silica and wherein $R^2$, $R^3$ and $R^4$ are the same and are ethyl.

41. A catalyst component in accordance with claim 40 wherein said vanadium compound is selected from the group consisting of $VOCl_3$, $VCl_4$ and $VCl_3$ and is present in a concentration in the range of between about 0.6 millimole and about 0.9 millimole of vanadium per gram of silica.

42. A catalyst component in accordance with claim 41 wherein said molar ratio of said alcohol to said vanadium compound is in the range of between about 0.1:1 and about 0.6:1.

43. A catalyst component in accordance with claim 42 wherein said alcohol is characterized by $R^6$ being $C_1$–$C_8$ alkyl and by being present in a concentration in the range of between about 0.2 millimole and about 0.8 millimole per gram of silica.

44. A catalyst component in accordance with claim 43 wherein said hexaalkyldisilazane is hexamethyldisilazane.

45. A catalyst component in accordance with claim 44 wherein said silica product of step (a) is heated at a temperature of between about 100° C. and about 200° C. for about 4 to about 6 hours prior to step (b).

46. A catalyst component in accordance with claim 45 wherein $R^6$ is $C_2$–$C_6$ alkyl and said molar ratio of said alcohol to said vanadium compound is in the range between about 0.2:1 and about 0.3:1.

47. A catalyst component in accordance with claim 46 wherein said compound or complex (1), said compound (2), said vanadium compound and said alcohol are introduced into said slurry as a solution wherein the solvent is an alkane identical to said inert hydrocarbon liquid slurrying agent.

48. A catalyst component in accordance with claim 47 wherein said product of step (f) is washed with said alkane slurrying agent.

49. A catalyst component in accordance with claim 48 wherein said product of step (g) is washed with said alkane slurrying agent.

50. A catalyst component in accordance with claim 49 wherein said step (c) involves contact with said compound or complex (1) and said step (d) involves contact with said compound (2) and wherein said products of steps (c) and (d) are washed with said alkane slurrying agent.

51. A catalyst component in accordance with claim 49 wherein said step (c) involves contact with said compound (2) and said step (d) involves contact with said compound or complex (1) and wherein said products of step (c) and (d) are washed with said alkane slurrying agent.

52. A catalyst component in accordance with claim 49 wherein said step (c) involves contact with (3) a mixture of said compound or complex (1) and said compound (2); and wherein said step (d) is omitted.

53. A catalyst component in accordance with claim 49 wherein inert hydrocarbon liquid slurrying agent solvent is heptane.

* * * * *

UNITED STATES PATENT AND TRADEMARK OFFICE
CERTIFICATE OF CORRECTION

PATENT NO. : 5,670,439
DATED : September 23, 1997
INVENTOR(S) : Linda N. Winslow; Raghu K. Menon

It is certified that error appears in the above-identified patent and that said Letters Patent is hereby corrected as shown below:

Claim 1, (C) should read $E_tH_sX^2_{2t+2-s}$

Claim 3, line 2, should read --- hexaalkyldisilazane ---.

Claim 24, line 1, delete "system".

Claims 25 through 30, line 1, delete "system", should read "A catalyst in .....".

Claim 34, line 1, claim 39 should read "claim 33".

Signed and Sealed this

Ninth Day of June, 1998

*Attest:*

BRUCE LEHMAN

*Attesting Officer*    *Commissioner of Patents and Trademarks*